United States Patent [19]

Sparkman

[11] 4,201,008
[45] May 6, 1980

[54] FISHING LURE AND SPINNER

[76] Inventor: James M. Sparkman, Rte. 1, Box 118-B, Brookline, Mo. 65619

[21] Appl. No.: 4,555

[22] Filed: Jan. 18, 1979

[51] Int. Cl.² ............................................. A01K 85/00
[52] U.S. Cl. .................................. 43/43.13; 43/43.14; 43/42.2
[58] Field of Search ................. 43/42.11, 42.13, 42.14, 43/42.15, 42.16, 42.17, 42.18, 42.19, 42.2, 42.21

[56] References Cited

U.S. PATENT DOCUMENTS

| | | |
|---|---|---|
| 849,036 | 4/1907 | Zimmerman . |
| 967,660 | 8/1910 | Pedersen .............................. 43/42.2 |
| 1,395,533 | 11/1921 | Tuttle ................................ 43/42.2 X |
| 1,627,637 | 5/1927 | Dahlquist . |
| 1,804,391 | 5/1931 | Abrahams ............................ 43/42.2 |
| 2,167,945 | 8/1939 | Gilliam .............................. 43/43.13 |
| 2,261,433 | 11/1941 | Demory .............................. 43/42.2 |
| 2,266,234 | 12/1941 | Mitchell ............................. 43/42.13 |
| 3,093,923 | 6/1963 | Jackson ............................. 43/42.2 X |
| 4,011,681 | 3/1977 | Johnson ............................. 43/42.11 |

Primary Examiner—Nicholas P. Godici

[57] ABSTRACT

A fishing lure for surface use comprising two fishhooks, two spinners, a generally V-shaped carrier bracket having vertical offsets to place the shanks of the fishhooks below the rotational axes of the spinners, and sinkers in association with each of the fishhooks. The spinners may be formed of a blank made from a sheet of metal having lugs at opposite ends thereof bent in parallel planes on opposite sides thereof; an opening through the blank spaced approximately equidistant from the lugs; a pair of conical protrusions extending outwardly from the plane of the blank, each such protrusion being on a side opposite from the lug adjacent thereto; and oppositely bent impeller blades. Also provided is an improved fishing lure which comprises the above spinner.

10 Claims, 5 Drawing Figures

FISHING LURE AND SPINNER

BACKGROUND OF THE INVENTION

This invention relates to fishing lures. In one aspect, this invention relates to an improved fishing lure. In another aspect, this invention relates to an improved spinner for use on a fishing lure.

Sport fishing may well be the most popular of all outdoor sports, having devotees from all walks of life and all ages. In sport fishing, man has endeavored to provide himself with equipment and particularly lures, which give him enjoyment in catching fish without removing the sport from the catch.

Over the years there has been a variety of forms, shapes, colors and so forth, of fishing lures. Some lures have been designed to attract bass, others to attract trout, and some have been designed to attract the fisherman at the bait shop with little or not consideration given to attracting the fish.

Surface-type fishing lures, which are generally, though not necessarily, constructed and designed for attracting and catching large mouth bass, usually comprise a single fishhook and a means for attracting the fish's attention, such as a spinner. Such spinner generally has a triangular shape with apertured mounting tabs or lugs at the forward and trailing ends, and oppositely bent impeller blades. These lugs may be bent both in the same direction, as disclosed in U.S. Pat. Nos. 967,660, 1,395,533, 1,627,637 and 3,093,923; or oppositely bent, with a slot provided between the lugs for the mounting wire to pass through, as disclosed in U.S. Pat. No. 849,036. Instead of apertured mounting lugs, the spinner disclosed in U.S. Pat. No. 2,261,433 has a plurality of alternating projections and recesses which provide a passage therebetween for a mounting wire.

The spinner disclosed in the aforementioned U.S. Pat Nos. 967,660, 1,395,533, 1,627,637 and 3,093,923 cannot rotate freely upon a mounting wire because the weight of the spinner is concentrated to one side. The spinner disclosed in U.S. Pat. No. 849,036 is better balanced, but weeds can get caught in the elongated slot and foul the spinner. The spinner disclosed in U.S. Pat. No. 2,261,433 is better balanced and does not have a weed-catching slot, however, if the mounting wire is bent, however slightly, the spinner cannot rotate freely.

Accordingly it is an object of the present invention to provide an improved spinner.

Another object is to provide an improved fishing lure.

Other objects, aspects and advantages of the present invention will be apparent to those skilled in the art from the following disclosure, the appended claims, and the attached drawing.

SUMMARY OF THE INVENTION

In accordance with the present invention there is provided an improved spinner for use on a fishing lure which comprises a blank made from a sheet of metal having lugs at opposite ends thereof bent in parallel planes and at substantially right angles to the plane of the blank and on opposite sides thereof, the lugs having holes therethrough for revolvably supporting the spinner upon a supporting wire; a substantially circular opening through the blank spaced approximately equidistant from the lugs; a pair of conical protrusions extending outwardly from the plane of the blank, each of the protrusions having its base portion at the opening and its vertex adjacent to the lug, each of the protrusions being on opposite sides of the blank from the lug adjacent thereto; and having laterally directed curved and oppositely bent impeller blades extending outwardly form a line connecting the wire-mounting holes.

Also provided in accordance with the present invention is an improved fishing lure which may comprise the above spinner. This lure comprises two fishhooks, two spinners, a generally U-shaped carrier bracket having vertical offsets to place the shanks of the fishhooks below the rotational axes of the spinners, and sinkers in association with each of the fishhooks.

DETAILED DESCRIPTION OF THE DRAWING

Figure 2:
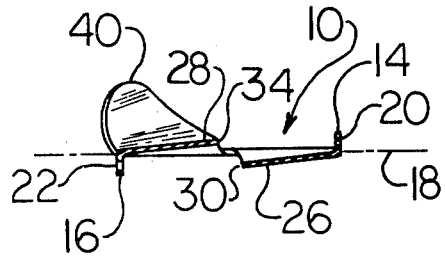
FIG. 2 is a view, partly in section, taken along lines 2—2 of FIG. 1.
Figure 1:
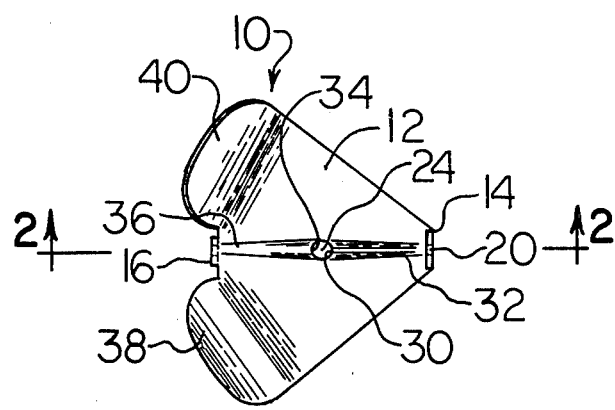
FIG. 1 is a top view of the spinner of this invention.
Figure 3:
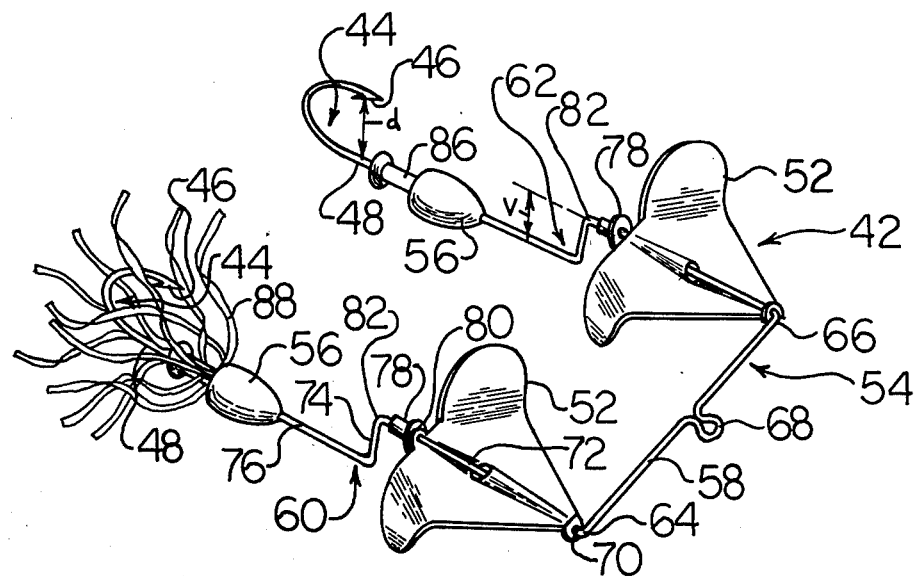
FIG. 3 is a perspective view of the fishing lure of this invention.
Figure 5:
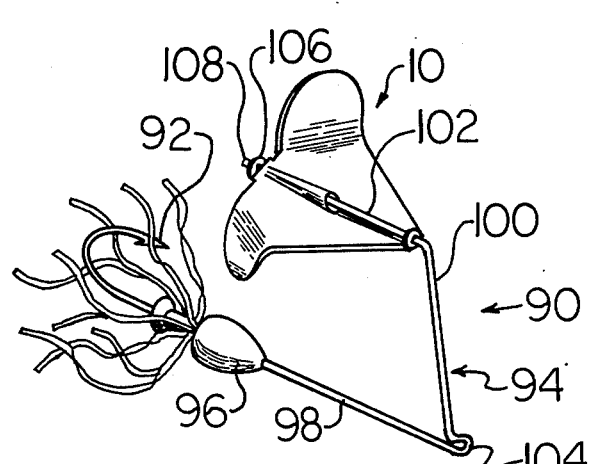

Referring now to the drawing and particularly to FIGS. 1 and 2, the spinner of this invention, designated generally by the numeral 10, comprises a blank 12 made from a sheet of metal having a lug 14 at its forward end and a lug 16 at its rear end. The lugs 14 and 16 are bent in opposite directions and at substantially right angles to the plane 18 of the blank 12. The lugs 14 and 16 have holes 20 and 22, respectively, therethrough for supporting the spinner 10 upon a supporting wire, as seen in FIGS. 3 and 5. An opening 24 is provided in the blank 12 along the imaginary line extending between the holes 20 and 22 in the lugs 14 and 16, and approximately equidistant from the lugs 14 and 16. The blank 12 has conical protrusions 26 and 28 extending outwardly from the plane 18 of the blank 12. The conical protrusion 26 has its base portion 30 at the opening 24 and its vertex 32 adjacent to the lug 14, and the protrusion 26 extends outwardly from the blank 12 on the side opposite the side to which the lug 14 is bent. Similarly, the conical protrusion 28 has its base portion 34 at the opening 24 and its vertex 36 adjacent to the lug 16, and the protrusion 28 extends outwardly from the blank 12 on the side opposite the side to which the lug 16 is bent. The spinner 10 also has blades 38 and 40, the blade 38 being bent in a direction opposite to that of the blade 40. The blades 38 and 40 are illustrated as being curved upwardly and downwardly at an angle oblique to the centerline of the spinner 10 and to approximately the same amount of curvature. It will be appreciated by those skilled in the art that the angle and amount of curvature may be varied, and that the angle and amount of curvature in the blades 38 and 40 may be the same or different. It will also be appreciated that the spinner 10 may have a variety of shapes and sizes; that although the spinner 10 is illustrated as being approximately triangular in shape, the present invention is not limited thereto.

Figure 4:
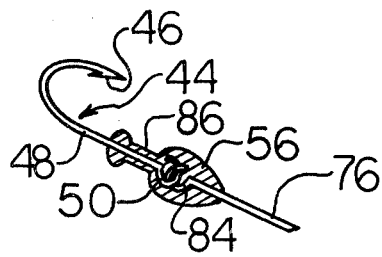
FIG. 4 is a perspective view, partly in section, showing the manner in which the fishhook and the carrier bracket are connected by the sinker; and, FIG. 5 is a perspective view of another fishing lure comprising the spinner of this invention.

Referring now to FIGS. 3 and 4, the novel fishing lure of this invention, designated generally by the reference numeral 42, comprises two fishhooks 44, each such fishhook having a barbed hook 46 and a shank 48 which terminates in a connecting eye 50, illustrated in FIG. 4, two spinners 52, a generally U-shaped carrier bracket 54 for the fishhooks 44 and the spinners 52, and two sinkers 36.

The carrier bracket 54 may be made of wire and comprises a first arm 58, a second arm 60 and a third arm 62. The first arm 58 has end portions 64 and 66 and a means for attaching a line, shown here as a line-attaching eye 68 at the approximate midpoint of the first arm 58. Since the second arm 60 and the third arm 62 are essentially identical, only the second arm 60 will now be described in detail. The second arm 60 has a forward end portion 70, a forward portion 72, a middle portion 74 and a rear portion 76. The forward end portion 70 is attached to, and preferably integral with, the end portion 64 of the first arm 58. The second arm 60 and the third arm 62 are attached approximately perpendicular to the end portions 64 and 66 respectively, of the first arm 58; and the forward portions 72 of the second arm 60 and the third arm 62 are coplanar with each other and with the first arm 58. The middle portions 74 are inclined downwardly from the forward portions 72, and are preferably perpendicular thereto, to provide vertical offsets to place the rear portions 76 in a plane below and approximately parallel to the aforementioned plane of the forward portions 72 and the first arm 58. The forward portions 72, middle portions 74 and rear portions 76 of each of the arms 60 and 62 are coplanar, and preferably, these planes of the two arms are approximately parallel and also perpendicular to the aforementioned plane of the forward portions 72 and the first arm 58.

The spinners 52 are preferably the same as the spinners 10 shown in FIGS. 1 and 2, although the invention is not limited thereto.

A bearing member 78 is positioned on the rear end of the forward portions 72 to permit free operation of the spinners 52. The lugs 80 of the spinners 52 cooperate with the bearing members 78 in an obvious manner. The bend 82 in the carrier bracket 54 between the forward portion 72 and the middle portion 74 provides a stopping surface against which the bearing member 78 rests. The bearing member 78 may be a bead having a hole therethrough, or a rivet, as shown.

The fishhook 44 is connected to the carrier bracket 54 as shown in FIG. 4. The terminal ends of the second arm 60 and the third arm 62 are formed into a hook 84 and the connecting eye 50 of the fishhook 44 is passed over the hook 84. An elongated, preferably elliptical sinker 56 is molded around the hook 84, the eye 50, and a portion of each of the shank 48 and the rear portions 76, so as to form rigid connections between the fishhook 44 and the carrier bracket 54. The sinker 56 also forms a core 86 upon which the body of the bait is secured, this body being formed, for example, a plurality of longitudinal ribbons, as indicated at 88 in FIG. 3.

FIG. 5 illustrates another fishing lure, designated generally by the numeral 90, which comprises the spinner 10 of the present invention. In addition to the spinner 10, this lure 90 comprises a fish hook 92, a carrying wire 94, and a metal sinker 96 surrounding the eye of the fish hook 92 and one terminal end of the wire 94, as shown, for example, in FIG. 4. The carrying wire 94 has a first horizontal arm 98, a second arm 100 at an angle to the first arm 98 and a third arm 102 coplanar with the first arm 98 and the second arm 100, the first and second arms being integrally connected to each other. The junctional connection between the first arm 98 and the second arm 100 is provided with a line-attaching loop 104. The spinner 10 is mounted upon the third arm 102 which serves as a shaft therefor, and a thrust bearing member 106 is provided at the free terminal end 108 of the third arm 102 to hold the spinner 10 on the arm 102.

The spinner of this invention is well balanced, thus providing maximum rotation in relation to the distance traveled, thereby providing a maximum lift to the associated lure. The central opening in the spinner provides a proper bubble trail on the surface behind the spinner as the lure is pulled through the water, and also adds an attention-attracting squeek. The spinner of this invention also has great transverse strength. The oppositely directed protrusions cooperate to provide a transverse strength which is not seen in the spinners of the prior art.

The fishing lure of this invention is a top water running lure which is relatively weed and snag resistant due to the self-righting action of the lure. It has been found that if the lure, upon casting, lands in an upside down position, the lure will right itself after being pulled through the water a short distance, generally in a distance equal to or less than two times the length of the lure.

Reasonable modifications and embodiments of the invention are possible within the scope of this disclosure without departing from the scope and spirit thereof.

I claim:

1. A spinner for use on a fishing lure comprising a blank made from a sheet of metal having lugs at opposite ends thereof bent in parallel planes and at substantially right angles to the plane of said blank and on opposite sides thereof, said lugs having holes therethrough for revolvably supporting said spinner upon a supporting wire, a substantially circular opening through said blank spaced approximately equidistant from said lugs, a pair of concial protrusions extending outwardly from the plane of said blank, each of said protrusions having its base portion at said opening and its vertex adjacent to said lug, each of said protrusions being on opposite sides of said blank from the lug adjacent thereto, and having laterally directed curved and oppositely bent impeller blades extending outwardly from a line connecting said holes.

2. The spinner of claim 1 wherein said blades have the same angle of curvature.

3. The spinner of claim 1 wherein said blades have different angles of curvature.

4. The spinner of claim 1 wherein said blades have the same amount of curvature.

5. The spinner of claim 1 wherein said blades have different amounts of curvature.

6. The spinner of claim 1 wherein said blank has an approximately triangular shape.

7. A surface-type fishing lure comprising, in combination, two fish hooks, each of said fish hooks having a shank and a barbed hook; two spinners; a generally U-shaped carrier bracket for said fish hooks and said spinners comprising a first arm, a second arm and a third arm, said first arm having two end portions and a line attaching means at the approximate midpoint thereof, said second and said third arms each having a forward end portion, a forward portion, a middle portion, a rear portion and a rear end portion, said second and said third arms each having said forward end portions attached approximately perpendicularly to said end portions of said first arm and said forward portions of said second and said third arms being coplanar with each other and with said first arm, said middle portions being inclined downwardly to provide vertical offsets to place said rear portions in a plane below and approximately parallel to the plane of said forward portions and said first arm; and a sinker in association with the rear portions of each of said second and said third arms; wherein said shanks of said fish hooks are attached to said rear end portions of said second and said third arms, and wherein said spinners are mounted for rotation upon said forward portions of said second and said third arms.

8. The lure of claim 7 wherein at least one of said spinners comprises a blank made from a sheet of metal having lugs at opposite ends thereof bent in parallel planes and at substantially right angles to the plane of said blank and on opposite sides thereof, said lugs having holes therethrough for revolvably supporting said spinner upon said bracket, a substantially circular opening through said blank spaced approximately equidistant from said lugs, a pair of conical protrusions extending outwardly from the plane of said blank, each of said protrusions having its base portion at said opening and its vertex adjacent to said lug, each of said protrusions being on opposite sides of said blank from the lug adjacent thereto, and having laterally directed curved and oppositely bent impeller blades extending outwardly from a line connecting said holes.

9. The lure of claim 7 wherein said vertical offset is equal to ⅛ to 2 times the distance between said shank and said barbed hook of said fish hook.

10. A fishing lure comprising, in combination, a single fish hook, a spinner, a sinker and a carrier bracket therefor, wherein said spinner comprises a blank made from a sheet of metal having lugs at opposite ends thereof bent in parallel planes and at substantially right angles to the plane of said blank and on opposite sides thereof, said lugs having holes therethrough for revolvably supporting said spinner upon said carrier bracket, a substantially circular opening through said blank spaced approximately equidistant from said lugs, a pair of conical protrusions extending outwardly from the plane of said blank, each of said protrusions having its base portion at said opening and its vertex adjacent to said lug, each of said protrusions being on opposite sides of said blank from the lug adjacent thereto, and having laterally directed curved and oppositely bent impeller blades extending outwardly from a line connecting said holes.

* * * * *